3,128,209
SOLUBLE AMYLOSE
Felix J. Germino, Peekskill, Benjamin R. Zeitlin, Spring Valley, and Anatole Sarko, Irvington on Hudson, N.Y., assignors to General Foods Corporation, White Plains, N.Y., a corporation of Delaware
No Drawing. Filed Oct. 6, 1959, Ser. No. 844,634
10 Claims. (Cl. 127—71)

This invention relates to amylose preparations, and more particularly to the treatment or modification of amylose to produce a dry product characterized by having improved properties of solubility and/or dispersibility in water and of rapid gel formation. Among other applications the product finds particular use in making instant foods, such as instant gel-type puddings and the like, and in making non-foods where cold-water solubility is required, as in paper and textile sizes and coatings.

As is known, amylose is obtained from starch and comprises a linear or open-chain molecule formed from up to about 5000 glucose units attached to each other by end-to-end linkages known as alpha-1,4-glocosidic bonds. Aqueous solutions of amylose are very unstable, tending to precipitate out (or retrograde) spontaneously to form stable, insoluble crystals of amylose. In the case of solutions containing more than 3% of amylose, the process of retrogradation produces a gel. (By retrogradation is meant the spontaneous precipitation of amylose from a solution of the same to form stable, insoluble crystals, and the crystals are said to be retrograded.) Such precipitated or retrograded amylose cannot be solubilized in water unless autoclaving techniques are used. After autoclaving, the resulting amylose solution, on standing, will again precipitate amylose crystals. Further autoclaving is necessary to solubilize these, and so on. Repeated autoclaving, however, produces undesirable destruction of the amylose chains.

According to the invention, an amylose solution or dispersion produced by autoclaving is subjected to a coprecipitation step wherein a coprecipitate is formed of amylose and an alkaline-reacting alkali metal salt such as disodium hydrogen phosphate. It has been found that such a coprecipitate may be solubilized in cold water by simply blending the same therewith, thus eliminating the necessity for further autoclaving. As may be apparent, the provision of a cold-water soluble amylose substantially widens the field of utility of amylose. Not only may the amylose-containing coprecipitate be dissolved and/or dispersed in cold water, but it is also capable of forming irreversible gels which, as noted, have application in making puddings and like products.

It may be noted at this point that aqueous solutions of the amylose-phosphate or amylose-salt coprecipitate are either true solutions or at least colloidal solutions as they do not show particulate matter when examined under the microscope. Although the term "solution" is used with reference to a mixture of amylose per se and water, such use should be understood as covering solutions and also all dispersions showing no particulate matter under the microscope.

Considering the invention in more detail, it comprises first subjecting the amylose starting material to conditions of temperature, pressure, and time sufficient to solubilize it to produce solutions containing at least 1% by weight of amylose, and preferably 0.1 to 25%. Any amylose may be treated or modified, as described herein, which is not cold-water soluble. Thus, it may be completely crystalline or amorphous, and it may have had substantially any previous processing. It can have any chain length, and the chain lengths may be substantially the same or widely different. In some cases, it may have some cold-water solubility, say up to 1% by weight, which however, is not sufficient to give a gel on standing or cooling. Advantages of the invention are particularly apparent in cases where the starting amylose is completely retrograded, that is, is insoluble in water at any temperature under normal pressure. The intrinsic viscosity of the starting amylose may remain the same during autoclaving or it may decrease owing to degradation. The amylose may be derived from any suitable source including amylose-containing starches such as those from potato, corn, tapioca, sago, wheat, rice, etc. Also, the amylose need not be pure amylose but may have mixed therewith such materials as amylopectin, dextrins, gums, proteins, and the like, all of which are more or less inert to the amylose and the phosphate or other salt under the conditions of the autoclaving and subsequent steps. By "inert" materials is meant those that do not react with the amylose and the salt and that do not precipitate with them either in the precipitation step to be described or in the subsequent gel-forming step. It is preferred, in the case of these impure amylose materials, that the amylose content thereof shall be at least 60% by weight.

The preferred solubilizing conditions comprise heating the starting amylose at a temperature of 160° C. and a pressure of about 100 p.s.i.g. for a time of up to about 5 minutes. It is not clearly known what occurs to the amylose during such treatment outside of simple disaggregation, although it is believed that some degradation of the molecule takes place, random points in the molecule undergo hydrolysis, some oxidation may occur, etc. Considering such changes, except disaggregation, as a degradation, it is desirable that the extent of the degradation be held to a minimum, as by using as low an autoclaving temperature for as short a time as possible. By "disaggregation" is meant the phenomenon of the breaking up of the agglomerates that are more or less characteristic of amylose without degrading the amylose molecule. These agglomerates are not believed to involve a chemical combination. The extent or amount of the treatment may suitably be measured in terms of the resulting solubility of the amylose undergoing treatment; in other words, the treated amylose should be capable of forming solutions and/or dispersions containing about 0.1 to 25% by weight of amylose. The conditions of the treating or solubilization step are variable. Thus, the temperature may range from 150 to 170° C., the pressure from 90 to 120 p.s.i.g., and the time up to about 45 minutes or an hour. The last-mentioned condition of time extends from the beginning of the heating, includes a holding period at the desired temperature, and terminates after cooling the material to a desired temperature and removing the same from the autoclave. Holding periods at the desired elevated temperature usually range from 1 to 5 minutes, but can be longer, say up to 30 minutes. As will be understood, these conditions are interdependent; thus at higher temperatures, the pressure is higher and the time may be lower, etc. Whatever conditions are selected, the resulting product should have a water solubility and/or dispersibility within the range noted. The autoclaved amylose should also have a minimum intrinsic viscosity in the range of 1.0–1.2.

Following the autoclaving step, the hot solution may be cooled to a suitably lower temperature to enable it to be handled more conveniently, although the temperature should be maintained above that at which the dissolved amylose would precipitate. For example, for a 15% amylose solution, cooling may be effected to bring the temperature of the solution within the range of 72° C. to the boiling point thereof; for a 10% solution cooling may be effected to a temperature as low as 57° C.; for a 5% solution the lower temperature may be 47° C.; and for a 3% solution one may cool to as low as 40° C. As may be apparent, there is a substantially linear relationship between the concentration of the amylose solution and the temperature at which precipitation occurs.

To the cooled amylose solution there is then added an aqueous solution of an alkaline-reacting, alkali metal salt such as phosphate so as to produce a resulting solution having a pH on the alkaline side, that is, above pH 7.0. By "alkaline-reacting" is meant the fact that the salt, when dissolved in water, gives a solution with an alkaline pH. In this connection, while other salts are applicable, for convenience the invention will be described in terms of phosphate salts. The phosphate solution may have a concentration of about 0.1% by weight up to the saturation concentration of phosphate, preferably 6 to 12% by weight. The resulting amylose-phosphate solution may contain 0.1 to 15% by weight of amylose, preferably 0.5 to 7%, and a still more preferred concentration is 1 to 3% by weight; and the alkali metal phosphate concentration may be from below 0.1% to 20 or 30% by weight. However, for trisodium phosphate the preferred concentration is 1.9 to 5.7%, and for disodium hydrogen phosphate it is 2.4 to 7.2% by weight. It is preferred that in the amylose-phosphate solution there shall be more phosphate salt than amylose, although this is not essential. Generally, the higher the amylose concentration, the higher must be the temperature to keep the amylose in solution. Besides those noted, other alkaline-reacting phosphate salts are suitable, such as the alkali metal metaphosphates, pyrophosphates, polymetaphosphates, and polypyrophosphates. Combinations of any two or more of the foregoing phosphate salts are operative. Also, alkali metal monobasic phosphates like sodium dihydrogen phosphate are useful in combination with one or more of the dibasic and tribasic phosphates noted above so long as the pH of the resulting solution is above 7.0. Where the amylose product is for non-food use, other salts like the alkali metal vanadates and arsenates are suitable, including the orthovanadates, polyvanadates, orthoarsenates, and polyarsenates. Alkaline earth metals may replace the alkali metals in the foregoing compounds. If any alkaline earth metal salt is not sufficiently soluble in water, a caustic soda solution may be added to increase the solubility thereof.

As may be apparent, the foregoing salts are characterized by the fact that they comprise salts of oxy acids, and by the fact that the anion portions of such acids, namely, $PO_4$, $AsO_4$, $VO_4$, are trivalent. In regard to the metal moiety of such anions, phosphorus and arsenic are nonmetals, being members of group 5b of the periodic table. Vanadium is a transition metal of group 5a. As is known, the oxy acids of phosphorus and arsenic are weak acids. Generally, the salt that is employed should not only be water soluble and have an alkaline reaction in water, but also it should be insoluble in the coprecipitating agent and it should be a non-reactive compound, that is, should not be an oxidizing or a reducing agent for amylose. The preferred salt is disodium hydrogen phosphate, which, it has been found, favors rapid gel formation from cold water solutions of the amylose-phosphate product.

It is possible to add in aqueous solution of caustic soda to the amylose solution instead of using a salt. The resulting coprecipitated amylose product will be soluble in cold water but will not gel in a conveniently short time. However, if the cold water solution is acidified with a suitable acid, such as phosphoric acid, hydrochloric acid, citric acid, acetic acid, tartaric acid, etc., a gel will form in a few minutes. Preferably, a food acid is used. It is apparent that by this technique a salt is formed in situ in the gel-forming step. If desired, salts like the phosphates may be formed in situ during the step of diluting the autoclaved amylose solution as by adding compounds which react to form phosphate salts, such as sodium hydroxide and phosphoric acid.

As indicated, alkali metal phosphates comprise a preferred class of salts.

The amylose-phosphate or amylose-salt solution is next subjected to a precipitating step, preferably by mixing ethanol with the solution in suitable amounts, say 30% or more by volume based on the amylose-phosphate solution. The amylose and phosphate are both insoluble in the aqueous ethanol solution that results and therefore they coprecipitate. Besides ethanol, other water-miscible low molecular weight oxy or hydroxy organic compounds are useful such as the C-3 and C-4 alcohols. Methanol is suitable where the amylose product is not intended for food use. Other coprecipitants are low molecular weight ketones like acetone and methyl ethyl ketone. These precipitants are commonly used oxygen-containing organic solvents, although, of course, they are not employed for their solvent action in the present instance. Mixtures of ethanol with any one of the above agents are contemplated. In particular, a mixture of ethanol and a polyhydric alcohol like glycerol or a glycol is suitable. Desirably, the precipitant is a polar compound.

The coprecipitate is separated from the solution as by centrifuging, filtering, or any suitable way, then washed in ethanol or acetone or a mixture of the two, and finally dried, suitably in a vacuum at room temperature or higher. The dry product is a white fluffy free-flowing powder comprising a mixture of amylose and phosphate or other salt. Generally, it has a particle size in the range of 20 to 250 microns. The amount of phosphate in the product may range from 20 to 74% by weight, but preferably is 20 to 30% by weight, the balance comprising essentially amylose. A small amount of moisture may be present which is usually 1 to 2% by weight but which may be higher, going up to about 10% by weight, depending on the manner of drying. It may be added, in this connection, that the amylose-phosphate product is more moisture absorbent than amylose alone; for example, the former may absorb twice as much water vapor than the latter over a given period.

The product is soluble in cold water in concentrations of up to 10% by weight; however, when used in puddings, it is usually employed in concentrations of 4 to 6% by weight. By "cold water" is meant water at room temperatures and below, for example, down to freezing temperatures, provided a liquid phase is still present. The product is also soluble in milk, including cold milk maintained at temperatures close to freezing; and it is soluble in solutions of sugar and milk. Solution of the product is usually accomplished by agitating the same in the liquid. Of interest in this connection is the fact that the product will dissolve in cold water, using agitation, in a time as low as 1 to 3 minutes to give complete solubilization. Conventional amylose, on the other hand, requires a time of 1 hour or more to dissolve in 1 N caustic soda solution at room temperature to give complete solubilization.

Solutions formed from the product are true solutions, or at least colloidal solutions as they do not show particulate matter when examined under the microscope. Irreversible gels are obtainable spontaneously from the cold solution and comprise amylose and phosphate. The gels form more rapidly from more concentrated solutions; thus, a gel may form in 4 to 5 minutes from a 6% solution but may require 10 to 20 minutes to form from a 5% or a 4% solution. It has been found that regardless of the phosphate content, the product has an intrinsic viscosity of at least 1.0–1.2; preferably it is 1.3 or higher. The intrinsic viscosity may be as high as 4.0 or 5.0, and may be even higher. It may be noted that the amylose content of the product has an amorphous X-ray diffraction diagram and that of the phosphate or other salt is crystalline. Although the nature of the union between the amylose and the salt is not known, it is believed that the two materials may be united to each other by the mechanism of physical adsorption. Of interest in this connection is the fact that when an amylose-disodium hydrogen phosphate product was subject to dialysis, it was found that both sodium and phosphate ions passed through the membrane but that the amylose did not. The same phenomenon occurred when other amylose-salt products were subjected to dialysis.

Products containing 20 to 30% by weight of phosphate are useful in that the gels which form from cold solutions of the same may be used for puddings. These gels are characterized by their complete lack of grittiness, giving a smooth non-gritty mouth feel. The product has other uses; for example, a material containing 30% by weight of phosphate may be used as an enteric film or coating to coat or envelop vitamins, drugs, etc. In the same way, the product may be employed as a binder to be mixed with pharmaceuticals or other compounds. Products having 30 to 74% by weight of phosphate will also produce gels but are less preferred for use in puddings; however, such products may be dissolved in cold or hot water and employed as coatings for paper, providing a glossy sheen thereon, and may also be used as fillers for paper, as a drilling mud, etc. The products are further characterized by exhibiting good stability on storage, being capable of making up into satisfactory gels after storage for several months. Furthermore, they are stable per se or when incorporated in a dry pudding or other final product mix.

The invention may be illustrated by the following examples:

Example 1

This example illustrates the preparation of an amylose-phosphate coprecipitate and the formation therefrom of a gel. About 30 gms. of potato amylose and 970 cc. of water (preheated to 95–100° C.) were blended briefly in a Waring Blendor, then charged to a Parr reaction vessel (preheated to about 95° C. with the electric heating mantle preheated to about 350° C.) where the mixture was heated to a temperature of 160° C. and a pressure of 100 p.s.i.g. was maintained. The contents were cooled to 90° C., after which the vessel was opened and the contents removed. The entire heating and cooling operations required 25 minutes. The product comprised a 3% solution of amylose in water. An aqueous solution of disodium hydrogen phosphate was prepared containing 72 gms./liter (a 7.2% solution) of the salt, and this solution was added to the amylose solution to produce a resulting solution containing 1% by weight of amylose and 2.4% of the phosphate salt. An equal amount of ethanol was then added upon which a white precipitate formed which was separated by centrifuging, and washed three times with absolute ethanol. The resulting powder was dried in a vacuum at room temperature and taken as the porduct. It comprised a white, fluffy, free-flowing powder containing about 30% by weight of the phosphate salt (calculated as trisodium phosphate). When 6 gms. of powder were blended with 94 cc. of cold water in a Waring Blendor, the product was soluble, forming a 6% by weight solution which gelled within 10 minutes to a firm, opaque, white, particle-less gel. By "particle-less gel" is meant the fact that the gel had no gritty mouth feel but was instead completely smooth.

The intrinsic viscosity of the amylose-phophate product was determined by the following procedure: an exactly weighed amount of product, preferably having an amylose concentration on the order of 0.5 gm., was dissolved in 100 ml. of 0.5 normal sodium hydroxide at a temperature of 0 to 2° C. The solubilization was helped by mechanical agitation. The resulting solution was filtered through glass wool and exactly 8 ml. of it was placed in a Cannon-Ubbelohde dilution viscometer No. 100, equilibrated at 30.10° C. The flow times of the solution were determined in triplicate and further dilutions of the same solution were made right in the viscometer with 0.5 normal sodium hydroxide. The flow times of all diluted solutions were also determined in triplicate and at amylose concentrations of 0.4, 0.3, 0.2, and 0.1% by weight. The specific viscosities were calculated from the flow times as per the following formula:

$$\frac{\text{Specific viscosity}}{C} = \frac{t - t_0}{t_0 \cdot C}$$

(where $t$ is the flow time of the solution in seconds, $t_0$ is the flow time of the solvent in seconds, C is the concentration of amylose in weight percent).

The ratios of specific viscosities to concentrations were plotted versus the amylose concentrations and the resulting straight line was extrapolated to 0% concentration. The viscosity at 0% concentration is termed the intrinsic viscosity. As determined by this procedure, the intrinsic viscosity of the amylose-phosphate product of this example was 1.30. As is known, intrinsic viscosity is related to the chain length of the amylose.

Example 2

The ungelled product formed in Example 1 was used to make a pudding in the following manner. About 5 gms. of the product powder was added to a solution of about 100 ml. of fresh whole milk at a temperature of 4° C. containing about 10 gms. of sugar and sufficient amounts of vanilla flavor and suitable coloring. The milk, sugar, flavor, and coloring are conventional pudding ingredients. The mixture was blended in a Waring Blendor until fully solubilized, using a blending action of minimum speed to effect the solution. The resulting solution was a creamy, viscous mixture which solidified to a firm, opaque gel within 10 minutes. The mouth feel of the gel was that of a creamy, non-gritty, smooth pudding approximating in taste and texture a cooked starch pudding.

It has been found that the addition of amylopectin to the amylose-salt product, prior to gel formation, can increase the viscosity of the resulting gel and reduce any tendency for syneresis to occur. In addition, the rigidity of the gel may be altered by means of the amylopectin. Suitable amounts of the latter may be used, say up to 20% by weight based on the amylose-salt product. The amylopectin may be added at any suitable point in the process, and if desired, may be incorporated with the starting amylose. Thus, Example 3 shows the preparation of puddings with amylose-amylopectin mixtures, the amylopectin being associated with the amylose throughout the entire process. Example 4 illustrates the use of amylose-amylopectin mixtures of different ratios to form gels of different rigidities and strengths. In this connection, pregelatinized starch is also useful in place of amylopectin.

Example 3

About 40 gms. of potato amylose and 20 gms. of potato amylopectin and 940 cc. of water were charged to a Parr reaction vessel where they were autoclaved at a temperature of 160° C. and a pressure of 100 p.s.i.g. for a total heating time of 35 minutes after which the contents were cooled to approximately 90° C., the vessel was opened and the contents removed. The resulting aqueous solution contained 4% dissolved amylose and 2% dissolved amylopectin. An aqueous solution of disodium hydrogen phosphate was prepared containing 144 gms./liter of the salt and this solution was added to the amylose-amylopectin solution, producing a resulting solution containing 2% by weight of amylose, 1% by weight of amylopectin, and 7.2% of the phosphate salt. An equal amount of ethanol was then added, there being formed a white precipitate which was separated by centrifuging, and washed as in Example 1. The resulting powder was dried in a vacuum at 50° C. It comprised a white, fluffy, free-flowing powder containing about 30% by weight of the phosphate salt. About 6 gms. of the powder was added to a solution consisting of about 100 cc. of fresh whole cold milk, about 10 gms. of sugar, vanilla flavor, and color, and the mixture was blended in a Waring Blendor with minimum agitation for a time sufficient to effect solution. The resulting solution was a creamy, white, viscous mixture which solidified to a firm opaque gel or pudding within 10 minutes. The bland taste and smooth texture of the gel were pleasant, being comparable to those of a cooked starch pudding.

Example 4

A charge of amylose and amylopectin in a weight ratio of 6:4 was autoclaved in the Parr reaction vessel; the resulting solution was treated with an aqueous dibasic sodium phosphate solution, and subsequently precipitated with ethanol, and the precipitate washed and dried, all as described in Example 3. About 6 gms. of the resulting powder containing 2.5 gms. of amylose, 1.7 gms. of amylopectin, and 1.8 gms. sodium phosphate were then added to 100 ml. of water at 4° C. The mixture was blended in a Waring Blendor until fully solubilized. The resulting solution was a viscous mixture which solidified to a white, opaque gel within 10 minutes. The gel had a smooth taste, was weakly bodied with long rigidity.

In the same way, a charge of amylose and amylopectin in a weight ratio of 9:1 was autoclaved and treated as above, and 5 gms. of the resulting powder containing 3.15 gms. of amylose, 0.35 gm. of amylopectin, and 1.5 gms. sodium phosphate was added to 100 ml. of water at 4°C. and blended until fully solubilized. The resulting solution was a viscous mixture which solidified to a white, opaque gel within 10 minutes. This gel could be demolded from the flask, maintained its body and had a high gel strength and rigidity.

Both of the foregoing gels were free of syneresis.

Gravies may be prepared by mixing an amylose-phosphate product, such as obtained in Example 1, with a meat flavor such as dry beef flavor, then adding the mixture to boiling water, stirring, and cooling until a gel forms. The resulting gel comprises a gravy which has the desirable texture and viscosity characteristics of a brown gravy. As is apparent, the preparation of the gravy is rather simple; it requires only about 5 minutes.

The product is further useful in industrial applications as a starting material or intermediate for the preparation of various amylose derivatives, being particularly valuable where a cold-water soluble material is desired. Such a material enables the derivative-forming reactions to be carried out at low temperatures owing to its cold-water solubility. As is apparent, such cold-water soluble material, when employed in these low temperature reactions, does not undergo heat degradation as in the case of conventional amyloses.

In connection with the starting amylose material, it may be noted that those materials which are soluble in hot water, say water at 60° C. or above, to give concentrations of about 0.1 to 25% of amylose by weight, can be introduced directly to the salt diluting or addition step. In other words, being sufficiently hot-water soluble, they need not be subjected to the autoclaving step.

It is to be understood that the invention is not restricted to the specific details of the foregoing description but is capable of obvious variations thereof without departing from its scope.

The following is claimed:

1. A method of producing cold water-soluble amylose, which comprises forming an aqueous solution containing about 0.1 to 25% by weight of amylose, adding to said solution an aqueous solution of a salt having a cation selected from the group consisting of alkali metals and alkaline earth metals and an anion selected from the group consisting of phosphates, arsenates and vanadates so that the resulting solution has a pH of more than 7.0, and coprecipitating the amylose and said salt from said resulting solution.

2. A method of producing cold water-soluble amylose, which comprises forming an aqueous solution containing about 0.1 to 25% by weight of amylose, adding to said soltuion an aqueous solution of a salt having a cation selected from the group consisting of alkali metals and alkaline earth metals and an anion selected from the group consisting of phosphates, arsenates and vanadates so that the resulting solution has a pH of more than 7.0, and coprecipitating the amylose and said salt from said resulting solution by mixing said resulting solution with a polar organic solvent which is completely miscible with water, which is substantially unreactive with amylose and said salt and in which amylose and said salt are insoluble.

3. A method of producing cold water-soluble amylose, which comprises forming an aqueous solution containing about 0.1 to 25% by weight of amylose by autoclaving amylose and water at a temperature range of 150 to 170° C. at a pressure of 90 to 120 p.s.i.g. for a period of time up to about one hour, adding to said solution an aqueous solution of a salt having a cation selected from the group consisting of alkali metals and alkaline earth metals and an anion selected from the group consisting of phosphates, arsenates and vanadates so that the resulting solution has a pH of more than 7.0, and coprecipitating the amylose and said salt from said resulting solution.

4. A method of producing cold water-soluble amylose, which comprises forming an aqueous solution containing about 0.1 to 25% by weight of amylose by autoclaving amylose and water at a temperature range of 150 to 170° C. at a pressure of 90 to 120 p.s.i.g. for a period of time up to about one hour, cooling said solution to a temperature higher than that at which the amylose precipitates therefrom, adding to said solution an aqueous solution of a salt having a cation selected from the group consisting of alkali metals and alkaline earth metals and an anion selected from the group consisting of phosphates, arsenates and vanadates so that the resulting solution has a pH of more than 7.0, and coprecipitating the amylose and said salt from said resulting solution.

5. A method of producing cold water-soluble amylose, which comprises forming an aqueous solution containing about 0.1 to 25% by weight of amylose, adding to said solution an aqueous solution of salt having an alkali metal cation and an anion selected from the group consisting of phosphates, arsenates and vanadates so that the resulting solution has a pH of more than 7.0, an amylose concentration of about 0.1 to 15% by weight and a salt concentration of about 0.1 to 30% by weight, and coprecipitating the amylose and said salt from said resulting solution.

6. A method of producing cold water-soluble amylose, which comprises forming an aqueous solution containing about 0.1 to 25% by weight of amylose, adding to said solution an aqueous solution of a salt having a cation selected from the group consisting of alkali metals and alkaline earth metals and an anion selected from the group consisting of phosphates, arsenates and vanadates so that the resulting solution has a pH of more than 7.0, and coprecipitating the amylose and said salt from said resulting solution by mixing said resulting solution with a polar organic solvent which is completely miscible with water, which is substantially unreactive with amylose and said salt and in which amylose and said salt are insoluble, said solvent being selected from the group consisting of low molecular weight alcohols and ketones.

7. A method as claimed in claim 6 in which said salt is disodium hydrogen phosphate and said solvent is ethanol.

8. A cold-water soluble amylose comprising a dry white fluffy powder comprising a mixture of amylose and a salt having a cation selected from the group consisting of alkali metals and alkaline earth metals and an anion selected from the group consisting of phosphates, arsenates and vanadates, said salt comprising 20 to 74% by weight of said dry mixture and the balance thereof comprising amylose, said amylose having an amorphous X-ray diffraction diagram and said salt being crystalline, said dry mixture having a minimum intrinsic viscosity in the range of 1.0 to 1.2, said dry mixture forming at least a colloidal solution with cold water up to a concentration of about 10% by weight of amylose, said solution having an alkaline pH and at concentrations of at least 4% by weight of amylose forming an irreversible gel comprising amylose and said salt, and said gel not being obtained in the absence of said salt from the dry mixture.

9. A cold-water soluble amylose comprising a dry white fluffy free-flowing powder comprising a mixture of amylose and a salt having a cation selected from the group consisting of alkali metals and alkaline earth metals and a phosphate anion, said salt comprising 20 to 30% by weight of said dry mixture and the balance thereof comprising amylose, said amylose having an amorphous X-ray diffraction diagram and said phosphate being crystalline, said dry mixture having an intrinsic viscosity of 1.3 to 5.0 and a particle size in the range of 20 to 250 microns, said dry mixture being capable of being completely solubilized in cold water in 1 to 5 minutes to form aqueous solutions having a concentration of up to about 10% by weight of amylose, said solutions having an alkaline pH, said solutions at concentrations of at least 4% by weight of amylose forming an irreversible gel, said gel not being obtained in the absence of said salt from the dry mixture, and said gel being capable of forming puddings having a smooth, non-gritty mouth feel.

10. The cold-water soluble amylose of claim 9 wherein said dry mixture contains 1 to 20% by weight of amylopectin for reducing syneresis of said gel and increasing the rigidity thereof.

References Cited in the file of this patent
UNITED STATES PATENTS

| | | |
|---|---|---|
| 2,614,945 | Krisan | Oct. 21, 1952 |
| 2,686,779 | Jones | Aug. 17, 1954 |
| 2,865,762 | Neukom | Dec. 23, 1958 |
| 2,884,412 | Neukom | Apr. 28, 1959 |
| 2,971,954 | Kodras | Feb. 14, 1961 |
| 2,974,049 | Frieders | Mar. 7, 1961 |